United States Patent
Azmi

(10) Patent No.: US 11,200,279 B2
(45) Date of Patent: Dec. 14, 2021

(54) DATUMTRONIC KNOWLEDGE SERVER

(71) Applicant: DATUMTRON CORPORATION, New York, NY (US)

(72) Inventor: Ashraf Azmi, New York, NY (US)

(73) Assignee: DATUMTRON CORP., New York, NY (US)

( * ) Notice: Subject to any disclaimer, the term of this patent is extended or adjusted under 35 U.S.C. 154(b) by 862 days.

(21) Appl. No.: 15/489,042

(22) Filed: Apr. 17, 2017

(65) Prior Publication Data

US 2018/0300425 A1  Oct. 18, 2018

(51) Int. Cl.
| | | |
|---|---|---|
| G06F 16/901 | (2019.01) | |
| G06N 5/02 | (2006.01) | |
| G06F 16/22 | (2019.01) | |
| H04L 29/08 | (2006.01) | |

(52) U.S. Cl.
CPC .......... *G06F 16/9024* (2019.01); *G06F 16/22* (2019.01); *G06N 5/022* (2013.01); *H04L 67/1002* (2013.01)

(58) Field of Classification Search
CPC .................................................... H04L 41/145
USPC ......................................................... 709/203
See application file for complete search history.

(56) References Cited

U.S. PATENT DOCUMENTS

| | | | |
|---|---|---|---|
| 2,016,001 A * | 10/1935 | Fuge ...................... | D03D 39/02 139/8 |
| 5,600,831 A | 2/1997 | Levy et al. | |
| 6,442,556 B1 | 8/2002 | Atman et al. | |
| 6,728,728 B2 | 4/2004 | Spiegler et al. | |
| 7,509,597 B1 | 3/2009 | Manohararajah et al. | |
| 7,752,164 B2 | 7/2010 | Rossiter et al. | |
| 8,266,093 B2 | 9/2012 | Cheong | |
| 9,104,780 B2 | 8/2015 | Ritchie et al. | |
| 9,177,171 B2 | 11/2015 | Roitman et al. | |
| 9,189,968 B2 | 11/2015 | Supanc et al. | |
| 9,275,340 B2 | 3/2016 | Patil et al. | |
| 9,367,806 B1 | 6/2016 | Cosic | |
| 9,426,716 B2 | 8/2016 | Thubert et al. | |
| 9,460,053 B2 | 10/2016 | Schmidt et al. | |
| 9,507,875 B2 | 11/2016 | Reddy | |
| 2004/0015487 A1* | 1/2004 | Lin ....................... | G06F 16/289 |

(Continued)

FOREIGN PATENT DOCUMENTS

| | | |
|---|---|---|
| WO | 2014037914 A1 | 3/2014 |
| WO | 2014150594 A2 | 9/2014 |
| WO | 2015093651 A1 | 6/2015 |

*Primary Examiner* — Kevin T Bates
*Assistant Examiner* — Emad Siddiqi
(74) *Attorney, Agent, or Firm* — David Postolski, Esq.; Gearhart Law LLC

(57) ABSTRACT

Systems and methods are provided for assigning client requests to one or more computer-implemented knowledge/database servers. Each server stores data as a directed acyclic graph of datums connected with a single type of relationship. The system includes a plurality of clients coupled to at least one router, wherein each client includes a graphical user interface and a processor configured to analyze inputted data, a plurality of routers configured to assign requests input though the plurality of clients to a plurality servers, at least one logger configured that includes a storage medium and is configured to store the requests, and a plurality of servers configured to perform tasks indicated by the requests.

37 Claims, 8 Drawing Sheets

(56) References Cited

U.S. PATENT DOCUMENTS

| | | | |
|---|---|---|---|
| 2011/0067030 A1* | 3/2011 | Isard | G06F 8/433 |
| | | | 718/102 |
| 2014/0282572 A1 | 9/2014 | Kang | |
| 2015/0006454 A1 | 1/2015 | Supanc et al. | |
| 2015/0222696 A1 | 8/2015 | Park et al. | |
| 2015/0310195 A1 | 10/2015 | Bailor et al. | |
| 2016/0011905 A1* | 1/2016 | Mishra | G06Q 10/06 |
| | | | 718/102 |
| 2016/0224645 A1 | 8/2016 | Dang | |
| 2016/0261466 A1 | 9/2016 | Daniel et al. | |
| 2017/0060973 A1* | 3/2017 | Liu | G06F 16/215 |

* cited by examiner

DATUMTRONIC KNOWLEDGE SERVER

CLAIM OF PRIORITY

This application is a United States non-provisional application and claims no priority to any previous patent or patent application.

FIELD OF THE EMBODIMENTS

This invention relates data and command assignments between database/knowledge servers and, in particular, to assigning client requests to one or more computer-implemented database/knowledge servers.

BACKGROUND OF THE EMBODIMENTS

The invention draws on concepts from two related fields and database server and knowledge representation schemes. The way data is represented in memory is the foundation of any data processing system. Currently, relational database representation is the most widely used. It is based on representing data into Tables, Columns, Rows, and Relations among tables. Other database schemes include Network and Hierarchical based structures.

Knowledge Representation (KR) schemes add an inference process to the data representation. Inference allows discovering new knowledge from the existing knowledge. For example; if we have the fact "All birds can fly" and also the fact that "Eagles are birds", then we can infer that "Eagles can fly" even though this fact is not explicitly given.

Examples of KR schemes are Production Systems, Semantic Networks, Frames, and Predicate Logic. Existing KR schemes use variety of elements; none of these schemes is based on a single abstract element.

This leads to the question; is it possible to find a single fundamental element of knowledge? Furthermore, for these fundamental elements to form any larger structure, they must be able to affect (or relate) to one another. Then the second question becomes: Is it also possible to find a single fundamental relationship among these elements that allows us to build a full Knowledge Representation scheme.

Examples of related art are described below:

U.S. Pat. No. 6,442,566 generally describes a frame-based knowledge representation system that is built on a relational database that is completely transparent to the user. A user at a client machine sends standard knowledge base queries across a distributed computer system and the system translates the queries into a language suitable for querying the database, such as Structured Query Language (SQL). The system stores a hierarchical data model that includes classes, particular instances of the classes, and relations among the classes and instances. Primitive objects, such as classes and instances, are organized with their associated attributes into frames. The system consists of three main tables and auxiliary tables. The frames table stores frames with associated slots and values, along with associated ownerships, access permissions, and other facets. The superclass-set table stores the frames and associated superclasses or ancestor classes. The third table, the classes table, stores class frames, slots, and values, and a slot type designating a slot as own or template. The database also includes tables for security definitions, logging, and other features. To query the knowledge base, the user submits a query, preferably according to the Open Knowledge Base Connectivity protocol, and the system translates the query into SQL. The result is formatted and processed to check user permissions before being returned to the user over the computer network. The system is accessed through a variety of interfaces, including a Web browser and various application programming interfaces.

U.S. Pat. No. 6,728,728 generally describes a knowledge tool, which includes a binary dataset for representing relationship patterns between objects and methods of its use. The use of the binary representation is based on an algorithm of data clustering according to binary similarity indices, which are derived from the binary matrix. Applications which are based on the binary representation and its compression capability include data mining, text mining, search engines, pattern recognition, enhancing data exchange rate between computerized devices, database implementation on hardware, saving storage space and adaptive network addressing.

U.S. Pat. No. 9,507,875 generally describes a graph database. The graph database includes one or more symbolic data stores and one or more key-value data stores. Each symbolic data store is configured to symbolically store sets of multiple hyper-graph nodes. Each key-value data store is configured to store attribute information for hyper-graph nodes and hyper-graph edges.

U.S. Patent Application Publication No. 2016/0224645 generally describes methods for building a semantic knowledge base for ontology-based data integration. A method includes receiving a semantic knowledge base related to an application domain, wherein the semantic knowledge base comprises a graph database and a global ontology schema, receiving a data collection related to an application domain, the data collection comprising structured data, semi structured data, and unstructured data, annotating the unstructured data into annotated data using predefined metadata defined by the global ontology schema, mapping and converting the structured data and the semi-structured data to semantic data into the graph database, integrating the annotated data with the semantic data in the graph database, and storing the semantic knowledge base in a database.

International Patent Application No. WO2014037914 generally describes a method and system for managing information relating to bio-ontological data. The method includes defining a semantic network representing bio-ontological data, and storing the data as a directed acyclic graph (DAG) having nodes and edges, wherein the nodes represent concepts that can have any number of attributes and the edges are directed and represent semantic relationships between concepts. The semantic network is defined by a semantic model which enforces the allowable relationships between a plurality of concept classes in a core database. The semantic model includes cross-ontology mapping of phenotypes, pathways and functions known to be associated with a disease of interest, resulting in a meta-ontology in which genes are transitively associated with a disease.

None of the art described above addresses all of the issues that the present invention does.

SUMMARY OF THE EMBODIMENTS

According to an aspect of the present invention, a system for assigning client requests to one or more computer-implemented servers is presented. The system includes a plurality of clients coupled to at least one router, wherein each client includes a graphical user interface and a processor configured to analyze inputted data, a plurality of routers configured to assign requests input though the plurality of clients to a plurality servers, at least one logger configured that includes a storage medium and is configured to store the requests, and a plurality of servers configured to perform tasks indicated by the requests.

According to another aspect of the present invention, a method for assigning client requests to one or more computer-implemented servers is presented. The method includes receiving, from a plurality of clients coupled to at least one router, at least one request, wherein each client includes a graphical user interface and a processor configured to analyze inputted data, assigning, using a plurality of routers, requests to a plurality servers, storing one or more requests into at least one logger that includes a storage medium, and performing, using a plurality of servers, tasks indicated by the requests assigned to each of the plurality of servers.

According to an embodiment, the router uses a designated server to check the validity and novelty of each request that adds data. According to an embodiment, if the request adds valid and/or new data, the router sends the request to all other servers.

It is an object of the present invention to include the system for assigning client requests to one or more computer-implemented servers, wherein each router includes a unique identification code.

It is an object of the present invention to include the system for assigning client requests to one or more computer-implemented servers, wherein one of the plurality of routers is designated as a primary router.

It is an object of the present invention to include the system for assigning client requests to one or more computer-implemented servers, wherein each of the plurality of servers is programmed to receive requests only from the primary router.

It is an object of the present invention to include the system for assigning client requests to one or more computer-implemented servers, wherein, if an error is found with the primary router, the plurality of clients are configured to select a new primary router and the plurality of servers becomes programmed to receive requests only from the new primary router.

It is an object of the present invention to include the system for assigning client requests to one or more computer-implemented servers, wherein the routers are defined as a set list of routers and each of the plurality of clients is in possession of the set list of routers.

It is an object of the present invention to include the system for assigning client requests to one or more computer-implemented servers, wherein each of the plurality of clients is configured to send requests to the primary router.

It is an object of the present invention to include the system for assigning client requests to one or more computer-implemented servers, wherein the plurality of servers are set as a list of servers in a particular order.

It is an object of the present invention to include the system for assigning client requests to one or more computer-implemented servers, wherein a first server in the list of servers is designated as a primary server.

It is an object of the present invention to include the system for assigning client requests to one or more computer-implemented servers, wherein the primary router is configured to route requests only to the primary server.

It is an object of the present invention to include the method for assigning client requests to one or more computer-implemented servers, wherein each router includes a unique identification code.

It is an object of the present invention to include the method for assigning client requests to one or more computer-implemented servers, further comprising designating one of the plurality of routers as a primary router.

It is an object of the present invention to include the method for assigning client requests to one or more computer-implemented servers, further comprising programming each of the plurality of servers is to receive requests only from the primary router.

It is an object of the present invention to include the method for assigning client requests to one or more computer-implemented servers, further comprising, if an error is found with the primary router, selecting, using the plurality of clients, a new primary router, and wherein the plurality of servers becomes programmed to receive requests only from the new primary router.

It is an object of the present invention to include the method for assigning client requests to one or more computer-implemented servers, wherein the routers are defined as a set list of routers and each of the plurality of clients is in possession of the set list of routers.

It is an object of the present invention to include the method for assigning client requests to one or more computer-implemented servers, wherein each of the plurality of clients is configured to send requests to the primary router.

It is an object of the present invention to include the method for assigning client requests to one or more computer-implemented servers, wherein the plurality of servers are set as a list of servers in a particular order.

It is an object of the present invention to include the method for assigning client requests to one or more computer-implemented servers, further comprising designating a first server in the list of servers as a primary server.

It is an object of the present invention to include the method for assigning client requests to one or more computer-implemented servers, wherein the primary router is configured to route requests only to the primary server.

DESCRIPTION OF THE PREFERRED EMBODIMENTS

Figure 1:
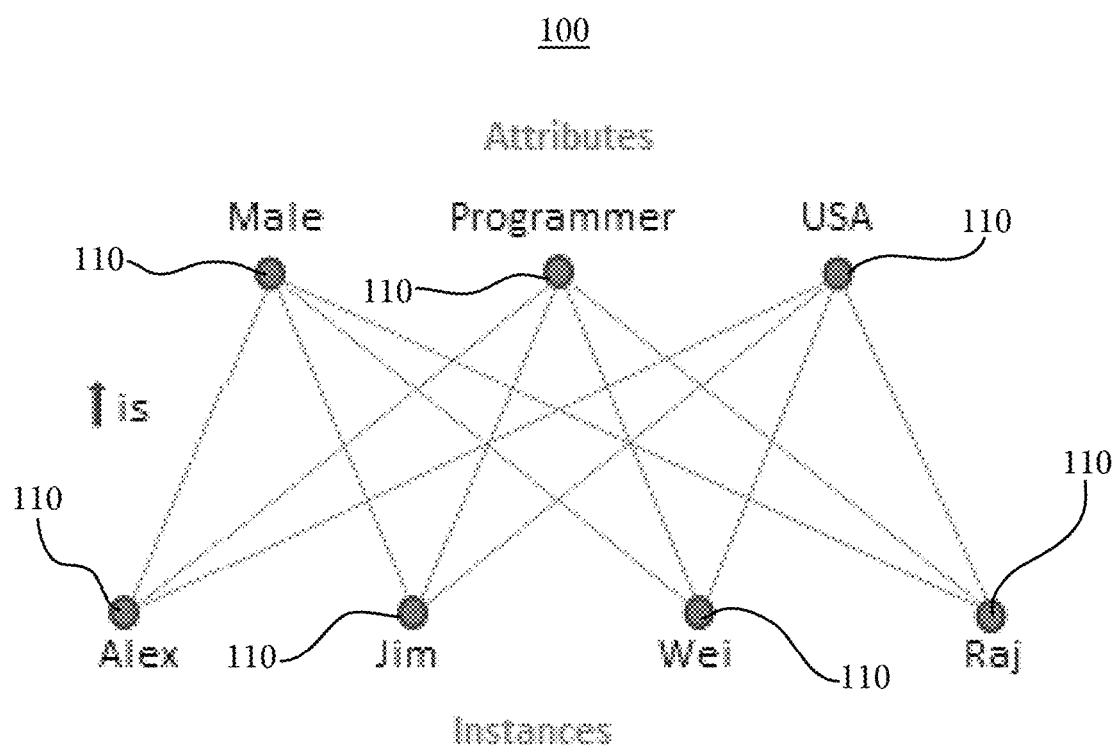
FIG. 1 shows a section of a Datum Universe graph including seven katums, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

The "Datum Universe" is a graph that represents data. Each node in the graph is defined as a "datum," which is the most abstract element of data. A datum has no content of its own, and is totally defined by links to other datums. There is a single type of abstract links in the graph, called "is". The Datum Universe is a Directed Acyclic Graph (DAG). The is links are directed up and there can be no circular links.

Primitive data types, for example, integers, strings, Date-Times, etc., are represented in their native representation as "objects." A datum may have zero or one objects linked to it. A datum may have no more than one object linked to it. In the DatumTron API, a datum that has an attached object is called "katum," wherein the "k" symbolizes that the katum is a knowledge element.

As a graph, each node in the graph includes multiple parents and multiple children. The set of katum parents are called "Attributes" and is abbreviated by A. The set of katum children are called "Instances" and is abbreviated by I.

Referring now to FIG. 1, a section of a Datum Universe graph 100 including seven katums 110 is illustratively depicted, in accordance with an embodiment of the present invention.

Figure 2:
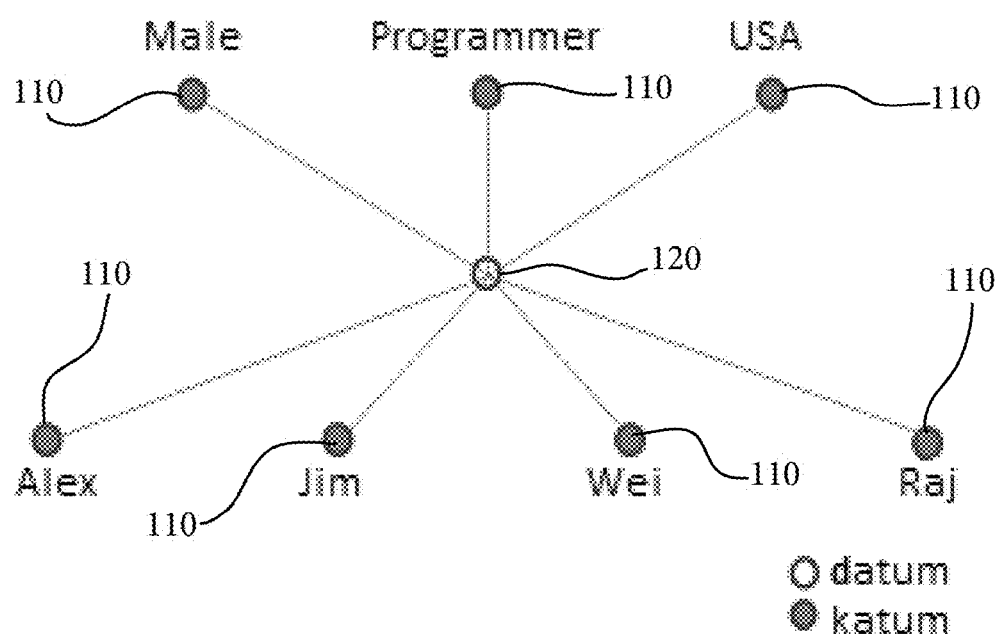
FIG. 2 shows a section of a Datum Universe graph including a series of katums organized into one class, according to an embodiment of the present invention.

As shown in FIG. 1, all nodes are katums 110 since they have strings attached to them ("Male", "Programmer", "USA", "Alex", "Jim", "Wei", "Raj"). It is noted that "Male," "Programmer," and "USA" are also instances of other katums; e.g., Gender, Occupation and Country of residence. Individual programmers may have other attributes as well, such as instances of "Salary," etc. Since, in this example, all individuals share the same three properties, they are all classified into one class 120 (shown in FIG. 2). The new element in the middle is a datum 120; it has no object, and is shown as a hollow circle. As a datum, it is totally defined by its links to other elements. By introducing this datum 120, the number of links is reduced from 4*3 to 4+3, decreasing the necessary number of stored data points. This reduces the size of the graph (Graph size is defined as the number of edges). This datum 120 can be categorized as the US-Male-Programmers category. Datums represent pure classes and, therefore, help in classification, data mining, and machine learning.

Referring now to katums, a katum must have at least one link to another element (datum or katum) and exactly one link to an object. The following code snippet (shown in Table 1) illustrates a rough sketch of a katum C# class.

TABLE 1

```
class katum // not a real implementation
{
    public IEnumerable<katum> A { get; } // Attributes
    public IEnumerable<katum> I { get; } // Instances
    public object O;                     // The attached object
}
```

For example; to represent the fact defined as "apple is a fruit", an apple katum is created that links to a fruit katum and onto which the string "apple" is attached. The strings "apple" and 'fruit" are the objects attached to the respective katums.

The following illustration (Table 2) shows a relational table that represents fruits and the corresponding Datum universe datum-pair representation.

TABLE 2

| Relational Table | | Datum Universe |
|---|---|---|
| Fruit | | fruit is thing |
| key | color | color is thing |
| apple | ... red ... | apple is fruit |
| | | red is color |
| | | apple is red |

Notice that the table, the column, the row primary key, and the field values are all represented as katums. The distinctions between the katums come from how they are linked to each other in the graph (shown in FIG. 3).

Figure 3:
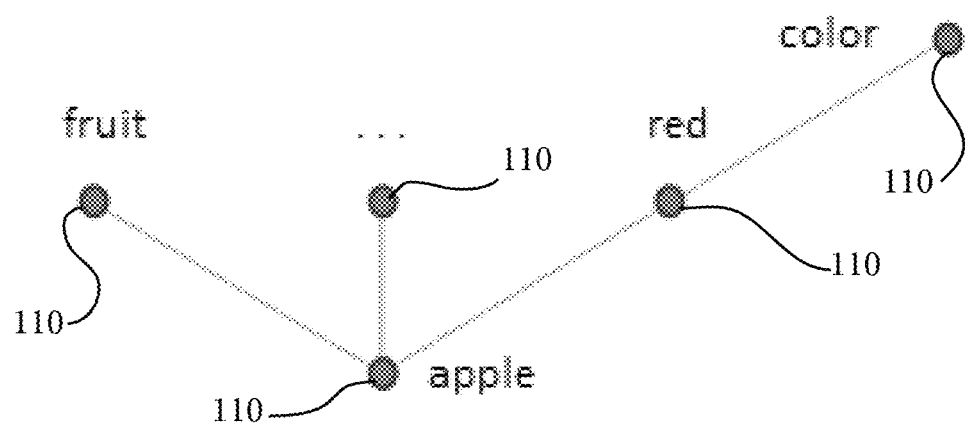
FIG. 3 shows a section of a Datum Universe graph indicating attributes of a katum, according to an embodiment of the present invention.

As shown in FIG. 3, fruit and red are attributes 130 of apple, while apple is an instance 140 of fruit and red.

The first attribute of a katum is the default inheritance provider in DatumTron and is referred to as a0. In this case, fruit is the a0 attribute for apple, which means that apple inherits all the attributes of fruit by default.

The fundamental unit in an Entity-Attribute-Value (EAV) and Resource Description Framework (RDF) models is the triple. For example, "The color of apple is red." is represented as the triple: (Apple, Color, Red).

In this triple, Apple is the entity, Color is the attribute of the entity, and Red is the value of the attribute.

In the Datum Universe, the fundamental unit is a pair. So the above triple is deconstructed into two pairs: (Apple, Red) and (Red, Color).

An advantage of a more granular model is that there are only two meta concepts to work with; the Datum and the "is" link. This enables data to be manipulated with a simpler set of operators, enabling more generic algorithms to be written.

According to an embodiment, a DatumTron In-Memory Graph Database Application Program Interface (DatumTron API) is disclosed. The DatumTron API is a .NET implementation of the Datum Universe model. DatumTron provides functions and operators to add and remove data to the graph, maintaining the graph's integrity. According to an embodiment, the DatumTron also provides the functions and operators necessary to query the data, and deduces new data not explicitly provided.

The need to keep the graph in memory arises from the need to conduct complex inference and classification logic on data elements in near real time. A graph model requires the ability to follow links in many directions effectively. This is contrasted with the mostly sequential nature in a relational model. According to an embodiment, a Datumtronic server is used that efficiently uses memory.

To that extent, the server uses different data structures to store datums depending on the number of links each datum has. As the number of links increases, the server switches between several data structures to store the links more efficiently while providing a fast access time that is independent of the size of the links. According to an embodiment, the server uses disk segments for very large Instance sets.

A list of relevant definitions can be found at Table 3:

TABLE 3

Definitions

| | |
|---|---|
| Datum | The most abstract element of data. It is defined totally by its links to other datums. It has to have at least two links to other datums (if it has one link only, it will not be distinguishable from the other datum). |
| Katum | A katum is a datum with one "object" attached to it. |
| Object | A representation of any primitive type, in .NET. |
| Is | The directed link from one datum to another. |
| Attribute | The katum on the top of the link. |
| Instance | The katum on the bottom of the link. |
| a0 | The first attribute of a given element. This is the default parent to inherit from. |
| A | An IEnumerable<katum> that iterates on all the direct Attributes of a given element. |
| I | An IEnumerable<katum> that iterates on all the direct Instances of a given element. |

According to an embodiment, the Datumtronic Server may execute commands in one of three modes. First, for individual Datumtron API functions, the server has a corresponding command for each API function. Second, for generic "ask" an/or "tell" commands that include a source code (in one of several common programming languages) of multiple Datumtron API calls, the server compiles the source code into special functions, caches it, executes the compiled function against the Datum Universe, and returns the result to a client (directly or indirectly). Third, when the Datum Universe itself has katums that have attached executable code, the server can receive it as data and execute it as code.

There is a one-time initialization (shown in Table 4) when using the API directly, by calling datum.setup. This call returns the root datum. The function takes an IAtum object that provides the concrete implementation of datums and katums. IAtum keeps the door open for providing multiple implementations of datum and katum objects with different performance/memory profiles.

TABLE 4 katum thing = datum.setup(new atum( ));

The database can be saved to a datum file and loaded from that file. The following code extract shows an example of loading a file, such as, e.g., a myDatabse.datum file.

TABLE 5 katum myDatabase = katum.load(new atum( ), @"..\..\myDatabase.datum");

The addition of data is now discussed. Adding data involves creating a new katum and assigning attributes to it. A new katum must have a parent which is the base attribute a0. Also, a katum must have an attached object. In the following examples, the attached objects are the string literals "color," "taste," etc. The base attribute a0 is the default provider of inheritance.

Creating a new katum is achieved by a "get" function, which is also represented by the "|" operator. The "get" function means: find an existing katum, or create a new katum with this parent and this object. This is the only way to create new katums and add them to the Datum Universe graph. The get function insures that no two instances of a katum have the same object. Notice that "thing" is the root defined in the previous code extract. Also, notice that the variable color holds a reference to a new katum which has the attribute katum thing, and the string object "color."

TABLE 6 katum color = thing.get("color");   // New katum is created
katum c1 = color;   // c1 holds a reference to the katum color
katum c2 = thing.get("color");
katum c3 = thing | "color";
// c3 is equal to c2, is equal to c1, and is equal to color At Table 7, more katums are defined.

TABLE 7

// define more katums using the | operator
katum taste = thing | "taste";
katum food = thing | "food";
katum fruit = food | "fruit";
katum apple = fruit | "apple";
katum mango = fruit | "mango";
katum red = color | "red";
katum sweet = taste | "sweet";

Assigning attributes to katums is achieved by using the "is" function (written, in this example, as "@is" since "is" is a reserved C# keyword). The @is function adds attributes to the katum. The "set" function also adds an attribute to the katum, but overrides any similar attribute with the given value. For example, if a value is "apple is red" is used, and "apple is green" is added, apple will have two colors: red and green. On the other hand, if a value "apple is red" is used, and use apple.set(color, green), apple will have one color; green. This is because "red" and "green" are both instances of "color", so "red" will be overridden with "green".

This can also be achieved by the [ ]operator as shown in Table 8.

TABLE 8 apple is red
apple. @is(red);
//OR
// apple can have one color which is red
apple.set(color, red); //OR
color[apple] = red; //OR//
color[apple] = color | "red"; // get color red if not created or create a new According to an embodiment, OK is defined to do Debug.Assert( ) to keep the code snippets short and clear (shown in Table 9).

TABLE 9 static void OK(bool condition) { Debug.Assert(condition); }

In order to remove data, the function "isnot" is used. The function isnot undoes the function is. Note that isnot can't remove a0. Since a0 was added when creating the katum, it can only be undone by removing the whole katum (shown in Table 10).

TABLE 10 apple.isnot(red); // apple is not red anymore
OK(!apple.Is(red));
apple.@is(red);    // back to apple is red
OK(apple Is red)

Using the "find" function or the "&" operator, katums can be found by their attached object in an O(1) time complexity. If "find" fails, it returns null. Contrast this with "get" and "|", which will create a new katum if one is not found.

TABLE 11

| method | operator | Meaning |
| --- | --- | --- |
| get | \| | Create a new katum if one doesn't exist already |
| find | & | Find a katum and, if not found, return null |

The question "Is red a color?" can be represented using the "Is" (Upper case I) function as "red.Is(color)?" Another variant on the "Is" function is the "Isa" function which only returns true if the attribute is the a0 attribute of this. So apple.Is(red) is true while appl.Isa(red) is not true and apple.Isa(fruit) is true (as shown in Table 12).

TABLE 12

```
katum red1 = color.find("red");       OK(red1 == red);
katum red2 = color & "red";           OK(red2 == red);
katum blue = color & "blue";          OK(blue == null);
OK(red.Is(color)); // Is red a color ?
OK(red.Isa(color)); // Isa → color must be the first attribute of red
OK(color.of(apple) == red);
OK(color[apple] == red);
```

In the example of color[apple]=red, color is a "Property" of apple, red is an "Attribute" of apple, and red is an "Instance" of color. In a.of(b), the of function finds an attribute of b that is an instance of a. The attribute found is not necessarily a direct instance of a. The of function starts the search from the direct attributes of b, and keeps moving up towards a. In the above example, red just happens to be a direct attribute of apple and a direct instance of color. This is not necessarily always the case.

Referring now to Inheritance, Inheritance is based on the transitive relationship; if a is b and if b is c then a is c. In the Datum Universe, for a katum k and attribute set $\{a_0, a_1, \ldots, a_n\}$, k is $a_0$ and k is $a_1, \ldots,$ and k is $a_n$. Now, if $a_0$ is $a_{00}$ and $a_1$ is $a_{11}, \ldots, a_n$ is $a_{nn}$, then k is $a_{00}$, k is $a_{11}$, and k is $a_{nn}$ by transition. For performance reasons, in Datumtron's of function, the built in inheritance uses only $a_0$ by default for inheritance. In the following code extract (as shown in Table 13), since fujiApple is an apple and since an apple is red, then fujiApple is red.

TABLE 13

```
katum fujiApple = apple | "fujiApple";
OK(color[fujiApple] == red); // inherited from apple
```

To explore multiple inheritance, DatumTron has the enumerator Ax, which iterates over all attributes and their attributes.

Another form of inheritance is shown in the following code extract (Table 14). In this case, we know that fujiApple's color is darkRed. If "Is the color of fujiApple red?" is asked, true is returned, since darkRed is red. Note that color[fujiApple] is not equal to red but only "is" red.

TABLE 14

```
katum darkRed = red | "darkRed";
apple.@is(darkRed);
OK(color[fujiApple] == darkRed);
OK(color[fujiApple] != red);
```

TABLE 14-continued

```
OK(color[fujiApple].Is(red));
OK(red[fujiApple] == darkRed);
```

Any katum can have a set of instances represented by the I set. Each instance katum has its own object. In the examples presented thus far, it has been mostly strings. Apple is an instance of fruit and fujiApple is an instance of apple. If it is desired to change an attribute, the set function may be used to modify the value. However, if some attributes do naturally change over time, the "now" function may be used. In the following code extract (Table 15), fujiApple.now(pricePerPound|1.3) creates a new instance of fujiApple and attaches an object to it of type "time" containing the current DateTime value. Copies all the attributes from fuijApple, then sets fujiApple pricePerPound to 1.3. The copied instance is known to DatumTron as a Time Instance and contains the previous state of its a0 katum (in this case fujiApple) up until the time stamp attached to it.

If the pricePerPound of fujiApple is asked, the latest value is returned, which, in this example, is 1.3. If the previous time instances of fujiApple need to be accessed, the "at" function or "[ ]" operator is used, as shown in the following code extract (Table 15). Time instances are treated just like any instance, with the exception of inheritance. Inheritance of attributes skips a0, since a0 contains the "now" attribute values.

TABLE 15

```
katum pricePerPound = thing | "pricePerPound";
fujiApple.set(pricePerPound | 1.5);
fujiApple.now(pricePerPound | 1.3); //price changing over time
fujiApple.now(pricePerPound | 1);
OK(pricePerPound[fujiApple] == 1); // current time instance of fujiApple
OK(pricePerPound[fujiApple.at(0)] == 1.5); //OR just use [0]
OK(pricePerPound[fujiApple[0]] == 1.5);
OK(pricePerPound[fujiApple[1]] == 1.3);
OK(fujiApple.countI == 2); // number of instances under fujiApple
```

DatumTron provides count1 property which is equivalent to LCount but relies on the concrete implementation for a fast O(1) time complexity. This gives the instance count, whether they are regular or time instances.

The object attached to a katum can be of type "function", such that when the value of the object is requested, the function is executed and its value is returned. For example, in the following code extract (shown in Table 16).

TABLE 16

```
katum banana = fruit | "banana";
katum weight = thing | "weight";
apple.set(weight | 1);
mango.set(color | "green", weight | 0.9);
banana.set(color | "yellow", weight | 1.1);
fruit.set(weight | AvgFunc); // <--- set the weightof fruit to a
function object
OK(weight[fruit] == 1); // average of 1, .9, 1.1
```

Because the weight of fruit is set to a function object AvgFunc, when the value of weight of fruit is requested, the function AvgFunc is executed. The AvgFunc is a user provided function and has to have the function signature as follows (Table 17).

TABLE 17 public delegate object function(katum property, datum item);

The body of the AvgFunc is shown in the following code extract. It uses the I enumerator to iterate over the instances of k and calculate the value of the numberAttribute at each instance, take the object attached as a double value, and calculate the average (shown in Table 18).

TABLE 18

```
static object AvgFunc(katum numberAttribute, datum k)
{
    if (k == null || number Attribute == null) return null;
    return k.I.Average(i => numberAttribute[i].asDouble);
}
```

Notice that the AvgFunc is totally generic and that it doesn't know about fruits or weights. It calculates the average of an attribute of all instances of a katum. However, According to various embodiments, other, less generic functions may look for specific attributes, like quantity and price, to calculate total price.

Another way to embed code is to have an object that implements the IFunction interface.

Figure 4:
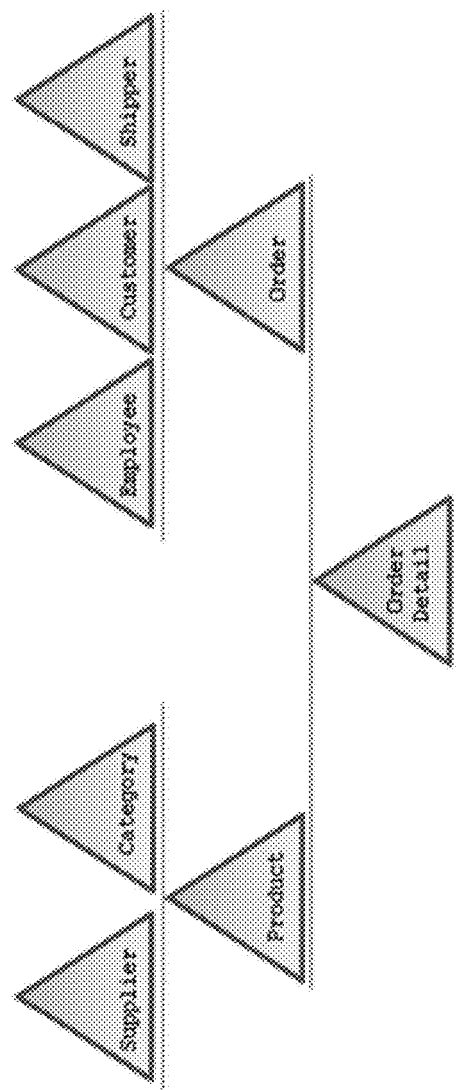
FIG. 4 shows a diagram showing relationships among various tables in a database and geared towards the Datum Universe, according to an embodiment of the present invention.

Referring now to FIG. 4, a diagram showing the relationships among various tables in the database and geared towards the Datum Universe is illustratively depicted, in accordance with an embodiment of the present invention.

Starting at the bottom of FIG. 4:
- The "Order Detail" has "Order" and "Product" among its attributes. This also signifies that each "Order" instance has "Order Detail" instances. Furthermore, each "Product" instance has "Order Detail" instances that represent all "Order Detail" items from this product.
- The "Order" has, among its attributes, "Shipper," "Customer," and "Employee." Again, this signifies that an instance of "Shipper," "Customer," or "Employee" has instances that are orders.
- The "Product" has "Category" and "Supplier" among their attributes. Instances of "Supplier" and "Category" have instances that are products, representing products in a specific category and products supplied by a specific supplier.

The following code snippet (Table 19) shows an import function such as, e.g., a ImportMyData function. According to an embodiment, TableDescription objects may be replaced with a specified database table description.

TABLE 19

```
static katum ImportNorthwind( IAtum atum, string rootName,
                              string NorthwindConnectionString )
{
    var NorthwindScheme = new DatabaseScheme(new[ ]
```

TABLE 19-continued

```
    {
        new TableDescription("Customers", "Customer", new [ ]
        {"CustomerID"}), new TableDescription("Orders", "Order",
        new [ ] { "OrderID" },
            new [ ] {
            new            ForeignKey("CustomerID",
            "Customers"),                           new
            ForeignKey("EmployeeID", "Employees"),
            new ForeignKey("ShipVia", "Shippers") }),
        // Other tables...
    });
    returnImporter.ImportDatabase(
        atum, rootName, NorthwindScheme,
        NorthwindConnectionString);
}
```

The DatumImporter is a reference implementation of a relational database importer that creates "Table" and "Column" katums under the root. Each table has an instance under the Table katum. Each table also has an instance under the Column katum which represents its set of columns. For example, the Employees table in the database is represented by an "Employee" katum. Each Primary key in the Employees Table is represented by an instance under the Employee katum. In order to acquire the field value, column[key] is used, for example lastName[1] gives the last name of the employee with employeeID equal to 1.

Figure 5:
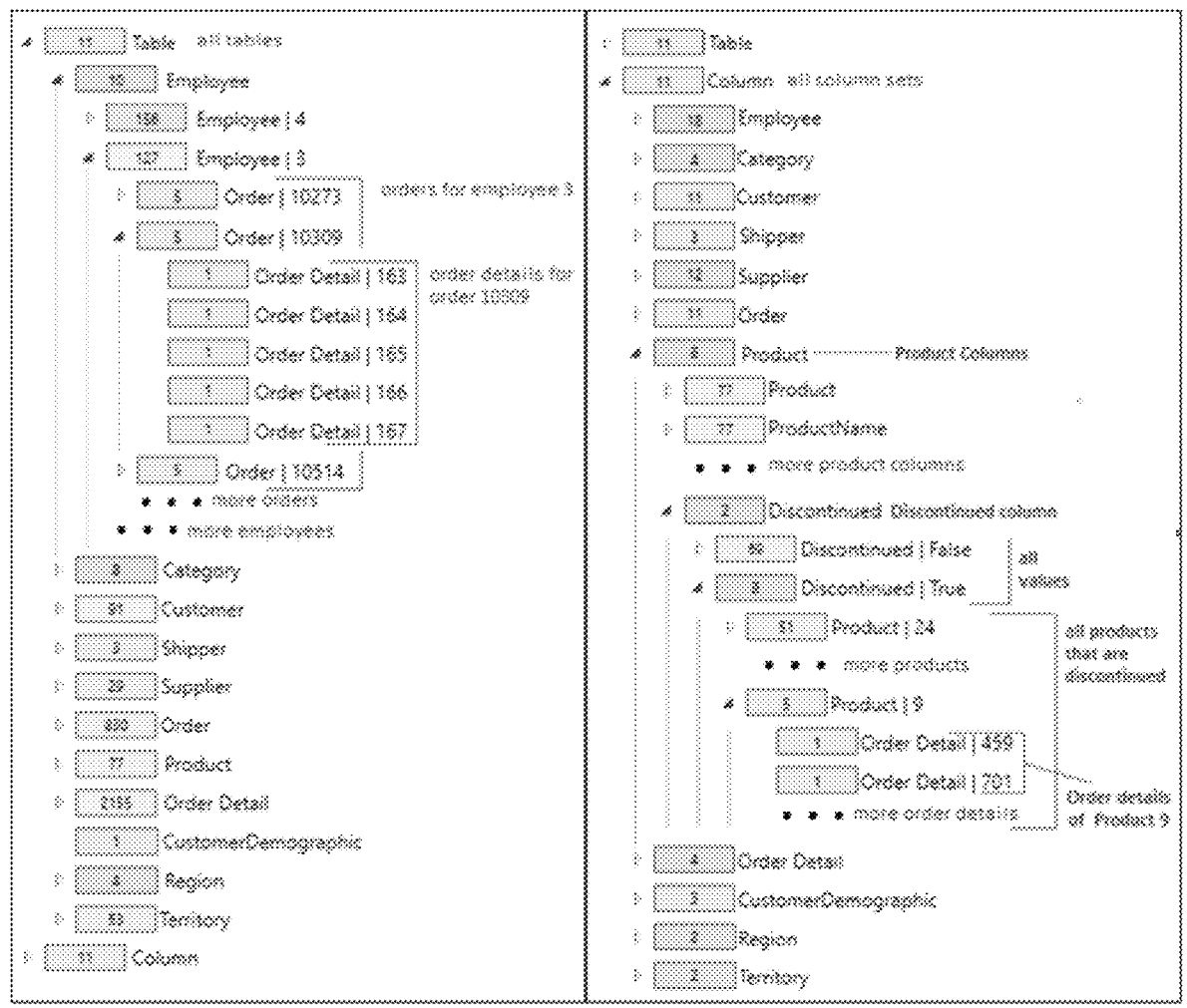
FIG. 5 shows a katums "Table" and "Column" illustratively depicted as a left tree and a right tree, according to an embodiment of the present invention.

Referring now to FIG. 5, katums "Table" and "Column" are illustratively depicted as a left tree and a right tree, in accordance with an embodiment of the present invention.

The Left tree shows the Table katum expanded, which has 11 instances representing tables. The Employee table is expanded, showing an instance for each key. Employee 3 is expanded to show its instances. Since an Order has an Employee as one of its (columns) attributes, Orders are seen as instances of an Employee. Order 10309 is expanded showing its related Order Detail katums. Again, since an Order Detail has an Order as one of its attributes, a set of Order Detail instances is found.

The right tree shows the Column katum expanded, showing a katum representing each table's column set. Expanding the column set of Product, various columns, like Product key, ProductName, and Discontinued attribute, are shown. Expanding the Discontinued katum shows two instances: False and True. Under "True" all product instances are shown to be discontinued. Looking at the instances of a product, the set of Order Detail instances that had this product is found. This is because Product is an attribute (column) in Order Details (Table).

As shown in Table 20, to get the Employee katum, Table & "Employee" are used.

The relational database importer uses Primary and Foreign keys to establish the relationships between tables. The database is saved as a datum universe file. In the following code snippets, loading the file and storing table and column katums in variables is shown.

TABLE 20

```
// Setup for Northwind
katum northwindDB = katum.load(new atum( ),
@"C:\DatumTron\DatumTron\Apps\NorthwindExamples\northwind.datum");
OK(northwindDB != null);
katum Table = northwindDB & "Table";              OK(Table != null);
katum Column = northwindDB & "Column";            OK(Column != null);
katum Employee = Table & "Employee";              OK(Employee != null);
katum Order = Table & "Order";                    OK(Order != null);
katum Customer = Table & "Customer";              OK(Customer != null);
katum EmployeeCols = Column & "Employee";          OK(EmployeeCols !=null);
```

TABLE 20-continued

| | |
|---|---|
| katum OrderCols = Column & "Order"; | OK(OrderCols != null); |
| katum CustomerCols = Column & "Customer"; | OK(CustomerCols != null); |
| katum ShipperCols = Column & "Shipper"; | OK(ShipperCols != null); |

To get a specific Employee column, the katum representing the set of columns of the Employee table is first obtained, then an & operator with the column name is performed. This is performed in either in one step or in two steps, as follows:

```
EmployeeCols = Column & "Employee";
EmployeeLastName = EmployeeCols & "LastName";
//OR
EmployeeLastName = Column & "Employee" & "LastName";
```

DatumTron API provides a number of Iterators over the datum universe graph. Iterators come in pairs, wherein one iterates in the down direction and one in iterates in the up direction. For now, let's consider the Instance iterator—abbreviated as I.

For example, Employee.I iterates over all employee instances (rows in the relational table). There are supporting properties and functions; countI which gives the count of instances, and the hasI which returns true if a specific instance exists in I. There is also the at(index) which returns the instance at the specific index. Notice that countI, hasI and at, relay on the specific implementation of katums and usually perform in O(1). An additional convenience function is doI(action, condition), which invokes an action on every instance that satisfies the given condition. An iteration over all employees is shown in Table 21

TABLE 21

```
// Iterate over all employees
OK(Employee.I != null);
Console.WriteLine("AllEmployees");
foreach (katum employee in Employee.I)
    Console.WriteLine(employee);
Console.WriteLine("All Employees again");
// Shorter alternative
Employee.doI(Console.WriteLine);
```

To query using a where clause, the IEnumerator Where function may be used, or the doI, specifying a condition, may be used (shown in Table 22). Both are equivalent.

TABLE 22

```
// List employees older than 50 years old var
EmployeeBD = EmployeeCols & "BirthDate";
foreach (var employee in Employee.I.Where(
            e => EmployeeBD[e] < DateTime.Today.AddYears(-50)))
    Console.WriteLine(employee);
// Shorter alternative
Employee.doI(Console.WriteLine, e => EmployeeBD[e] <
DateTime.Today.AddYears(-50));
```

The & operator has three overloads as shown in Table 23.

TABLE 23

The & operator overloads

| Method | Parameters, example, explanation |
|---|---|

TABLE 23-continued

The & operator overloads

| | |
|---|---|
| Find | katum & object → katum<br>color & "red"<br>Finds a katum that is an instance of color and has the object "red". If no katum with the string "red" is found, the expression evaluates to null. |
| andI | katum & katum → IEnumerable<katum><br>programmer & male → {Alex, Jim, Raj, Wei}<br>Enumerates instances of both programmer and male |
| andI | Katum & IEnumerable<katum> → IEnumerable<katum><br>Order & LondonCustomers<br>Enumerates over orders of all customers in London. Enumerate instances of each London customer that are also instance of Order. |

In the following example, the column that represents the Employee's Country is found, and then the instance representing USA is found. The & operator internally calls find which locates an instance that has the given object. Mainly using hashing, this operation has time complexity of O(1). Then the function of iterating over the instances of the "USA Employees" katum is performed and the results are printed (shown in Table 24).

TABLE 24

```
// Iterate over USA employees
katum USAEmployees = EmployeeCols & "Country" & "USA";   // O(1)
OK(USAEmployees!=null);
Console.WriteLine("USA Employees");
foreach (katum employee in USAEmployees.I)
    Console.WriteLine(employee);
```

A one line version of Table 24 is shown in the following code extract (Table 25).

TABLE 25

(EmployeeCols & "Country" & "USA").doI(Console.WriteLine);

Queries involving multiple tables are handled in Structured Query Language (SQL) with Join statements. In the equivalent Datum Universe representation, the relationships are embedded in the graph. The same is achieved using the & operator and the [ ] operator. The [ ] operator has three overloads shown in Table 26.

TABLE 26

The [ ] operator overloads

| Method | Parameters, example, explanation |
|---|---|
| At | katum[int] → katum<br>color[0] → red<br>Gets the color instance at index 0. Used for regular as well as time instances. |
| Of | katum[katum] → katum<br>color[apple] → red<br>Gets the attribute of apple that is an instance of color.<br>Note that, if color has a function attached, it is executed instead. |
| Of | katum[IEnumerable<katum>] □ IEnumerable<katum><br>color[fruit.I] → {red, green, yellow} |

TABLE 26-continued

The [ ] operator overloads gets the color of all fruit instances; color[apple], color[mango], color[banana]. By default, returns distinct values.

In the following code snippet (Table 27), since orders have an employee property, Employee[order] returns the employee who took the order. That employee's last name is then returned using EmployeeLastNameCol[ . . . ].

TABLE 27

```
// List the order number and employee's last name
// that have placed orders to be delivered in Belgium.
var EmployeeLastNameCol = EmployeeCols & "LastName";
var BelgiumOrders = OrderCols & "ShipCountry" & "Belgium"; // O(1)
foreach (var order in BelgiumOrders.I)
    Console.WriteLine("{0} by {1}", order,
EmployeeLastNameCol[Employee[order]]);
```

In the following query, the Shipper, Customer, and Order tables are used. Recall from the diagram in FIG. 4 that an instance of Shipper has instances that are orders representing orders shipped by a shipper. This means that iterating a specific shipper, like SpeedyExpressShipper, over its instances, the orders shipped by it are found. In the following code fragment (Table 28), the expression SpeedyExpressShipper.I returns the instances of SpeedyExpressShipper. The expression Order & SpeedyExpressShipper.I returns the instances which are orders (in case there are other types). Similarly, orders bought by customers living in Buenos Aires are returned. Finally, the two sets of orders are intersected to get orders that are sent by the company Speedy Express to customers in Buenos Aires.

TABLE 28

```
// Give the order id, employee id and the customer id for
// orders that are sent by the company 'Speedy Express' to customers
// who live in Buenos Aires.
var SpeedyExpressShipper = ShipperCols & "CompanyName" & "Speedy
Express"; // O(1)
var BuenosAiresCustomers = CustomerCols & "City" & "Buenos
Aires"; // O(1)
var O1 = Order & SpeedyExpressShipper.I; // orders sent by Speedy
Express
var O2 = Order & BuenosAiresCustomers.I; // orders bought by Buenos
Aires customers
foreach (var order in O1.Intersect(O2))
    Console.WriteLine("{0} {1} {2}", order,
Employee[order], Customer[order]);
```

In the following query (shown in Table 29), products bought or sold by Londoners are returned. Keeping in mind the database diagram, the expression ODI=OrderDetail & (Order & (Customer & customerCityLondon)) is broken down. The most inner part is (Customer & customerCityLondon). This is equivalent to customerCityLondon.I but insures that only instances that are customers are evaluated. The expression Order & (Customer & customerCityLondon) gets the orders of those customers. The full expression gets all of the Order Detail instances in these orders. Similarly, Order Detail instances from orders made by Londoners employees are returned. At the end, Product[orderDetail] is used to get the product from the orderDetail.

TABLE 29

```
// List products that were bought or sold by people who live in London.
var Product = Table & "Product";          OK(Product!=null);
var OrderDetail = Table & "Order Detail"; OK(OrderDetail!=null);
var customerCityLondon = Column & "Customer" & "City" & "London";
var employeeCityLondon = Column & "Employee" & "City" &
"London";
var OD1 = OrderDetail & (Order & (Customer & customerCityLondon));
var OD2 = OrderDetail & (Order & (Employee & employeeCityLondon));
foreach(var orderDetail in OD1.Union(OD2))
    Console.WriteLine( Product[orderDetail] );
```

In the previous query, orders shipped by a specific company to a specific city were listed. Another query is performed to determine if there are any patterns in the product ordered and the cities they were ordered from. For example, do orders from Berlin focus on some products while orders from Madrid focus on other products? Patterns are thus sought in the form "if customer city is city1 then product ordered is product1". This also needs to include how many instances that support this pattern and what is the probability associated.

In data mining, this is called Frequent Pattern Mining. "ifSide" is defined to be condition "customer city is city1" and "thenSide" is defined to be the conclusion "product ordered is product1". Furthermore, "Support" is defined to be the number of instances of orders that satisfy both the condition and the conclusion. Lastly, "Confidence" is defined to be the probability that the ordered product is product1 given that customer city is city1.

The following code extract (Table 30) shows how this can be achieved in the Datum Universe.

TABLE 30

```
const int minSupport = 10   // minimum 10 orders
const int minConfidence = 20; // minimum 20% probability
// Customer City and Product Category
var categoryName = Column & "Category" & "CategoryName";
foreach (var city in (Column & "Customer" & "City").I)
{
    var categories = Category[Product[
        OrderDetail & (Order & (Customer & city)), distinct:false ],
        distinct: false];
    int total;
    var freqDict = FreqDict(categories, out total);
    PrintPattern(city, categoryName, freqDict, total, minSupport,
minConfidence);
}
```

Notice the parameter distinct:false overrides the default value of true. This is used because the occurrences of each distinct value are counted to see if there are prevalent values.

The supporting functions FreqDict (Table 31) and PrintPattern (Table 32) are shown below.

TABLE 31

```
private static Dictionary<T, int> FreqDict<T>(IEnumerable<T> items,
out int total)
{      //How many times each item is found in items
    var dict = new Dictionary<T, int>( );
    total = 0;
    foreach (var item in items)
    {
        if (!dict.ContainsKey(item)) dict.Add(item, 1);
        else dict[item]++;
        total++;
    }
    return dict;
}
```

TABLE 32

```
private static void PrintPattern(katum condition, katum conclusion,
Dictionary<katum, int> freqDict, int total, int minSupport, int
minConfidence)
{
    foreach (var item in freqDict.Keys)
    {
        var support = freqDict[item];
        var confidence = (support*100)/total;
        if (support >= minSupport && confidence >
        minConfidence) Console.WriteLine("{0} -> {1}% {2} --
        support = {3}", condition, confidence, conclusion[item],
        support);
    }
}
```

The advantage of the Datum Universe representation is that it is fundamental enough to enable the creation of generic reasoning algorithms. For example, the previous example is generalized so that similar patterns can be found just by stating what is desired.

The first generalization step is shown in Table 33.

TABLE 33

```
var categories = Category[Product[
        OrderDetail & (Order & (Customer & city)), distinct:false ],
        distinct: false];
```

This type of pattern is hereinafter referred to as a "V-Pattern" (shown in Table 34) because it goes along a V path, as shown in FIG. 4. That is, it is started at the top from the customer, then moved down to the order, then to the Order Detail, and then up to Product, then to Categories.

TABLE 34

```
var categories = VPatterns(
        city, new[ ] { Customer, Order, OrderDetail }, new[ ]
{ Product, Category });
```

Where VPattern is as follows (Table 35):

TABLE 35

```
private static IEnumerable<katum> VPatterns(
        katum condition,
        katum[ ] ifPath,
        katum[ ] thenPath)
{
    var eset = ifPath[0] & condition;
    for (var i = 1; i < ifPath.Length; i++)
            eset = ifPath[i] & eset;
    var elist = thenPath[0][eset, distinct: false]; for
    (var i = 1; i < thenPath.Length; i++)
            elist = thenPath[i][elist, distinct: false];
    return elist;
}
```

Further generalization can be achieved (shown in Table 36) to have another VPatterns function that accepts an IEnumerable<katum>, minimum support, and minimum probability, and returns the patterns. Each pattern will be in the form of a Tuple<katum, katum, int, int>, for example, <City|Toulouse, Category|1, 10, 32> means that 32% of the city of Toulouse order items are from product category 1, and this pattern is supported by 10 instances.

TABLE 36

```
private static IEnumerable<Tuple<katum, katum, int, int>> VPatterns(
        katum conditions,
        katum[ ] ifPath,
        katum[ ]
        thenPath, int
        minSupport,
        int minProbability)
{
    foreach (var condition in conditions.I0)
    {
        var patterns = VPatterns(condition, ifPath, thenPath);
        int total;
        var freqDict = FreqDict(patterns, out total);
        foreach (var item in freqDict.Keys)
        {
            var support = freqDict[item];
            var probability = (support * 100) / total;
            if (support >= minSupport && probability >
            minProbability)
                    yield return new Tuple<katum, katum, int, int>
                            (condition, item, support, probability);
        }
    }
}
```

This function can then be stated as follows (Table 37).

TABLE 37

```
var patterns1 = VPatterns(Column & "Customer" & "City",
        new[ ] {Customer, Order, OrderDetail},
        new[ ] {Product, Category},
        10,
        20);
foreach( var pattern in patterns1)
        Console.WriteLine("{0} --> {1} support = {2} probability = {3}%",
                pattern.Item1, pattern.Item2, pattern.Item3, pattern.Item4);
```

Now to look for a relationship between employees and category of products they sell, the new VPatterns function can be used as follows (Table 38).

TABLE 38

```
var patterns2 = VPatterns(Table & "Employee",
        new[ ] {Order, OrderDetail},
        new[ ] {Product, Category},
        10,
        20);
    foreach (var pattern in patterns2)
        Console.WriteLine("{0} --> {1} support = {2} probability =
            {3}%", pattern.Item1, pattern.Item2, pattern.Item3,
            pattern.Item4);
```

The VPatterns function is now totally generic. Given the conditions source (Customer city or Employee), a path down and a path up, and minimum support and probability, the function can detect patterns of this "type" on any database. Moreover, one can write more code to discover the path down and path up given the conditions source and the conclusion domain (in these examples, Category). This code gives the console output in the introduction.

Figure 6:
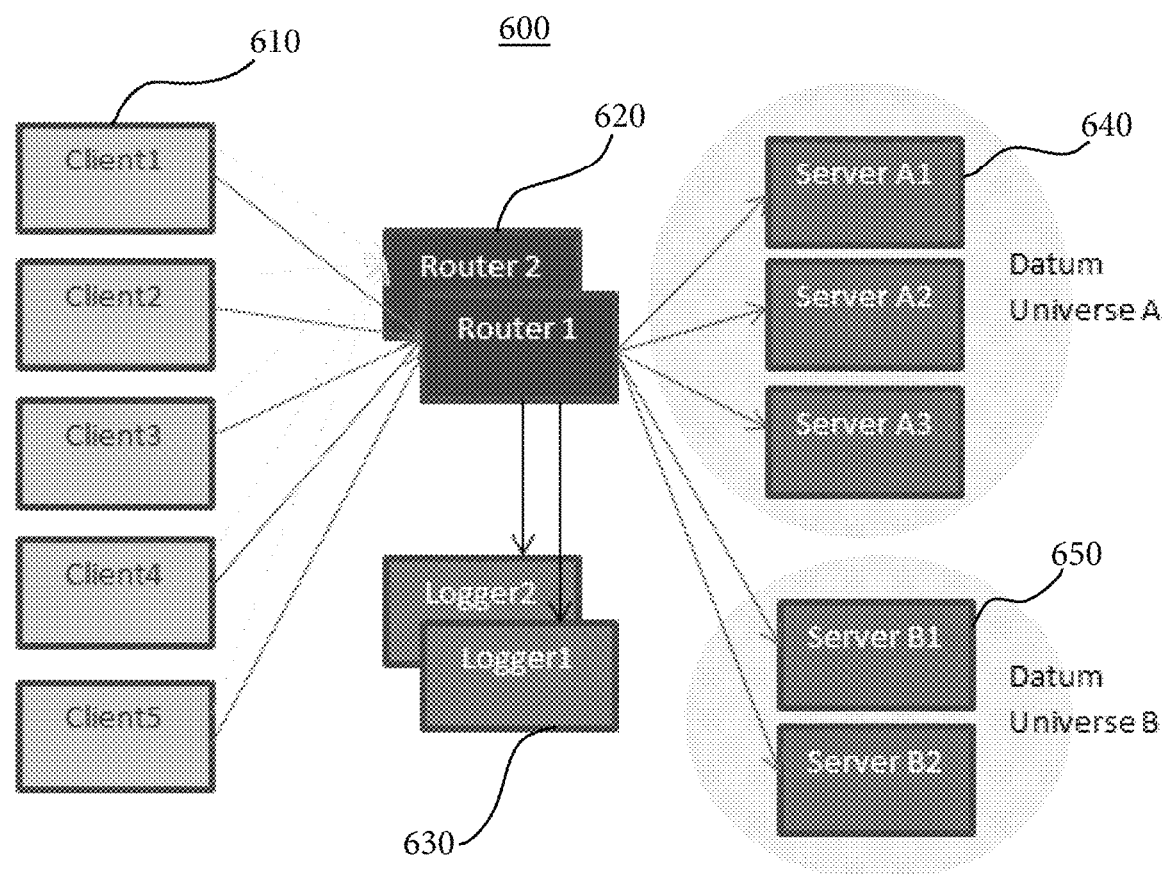
FIG. 6 shows a diagram of the architecture of a Datumtronic Knowledge Server (DKS), according to an embodiment of the present invention.

Referring now to FIG. 6, a diagram of the architecture 600 of a Datumtronic Knowledge Server (DKS) is illustratively depicted, in accordance with an embodiment of the present invention.

The use of datums, katums, and the like can be used in a DKS. A DKS is a computer system that accepts data and answer queries from its clients 610. In the process of answering queries, when needed, it is capable of reasoning about its content and deducing new facts that are not implicitly given to it. It can qualify its inferences with "confidence" probabilities and "support" levels.

DKS stores data in the Datum Universes Representation. As described above, this representation stores data in the form of pairs "a is b" where a and b are datums and "is" is the link between them. For example, "apple is red" and "red is color". This representation forms a special type of Directed Acyclic Graph of datums. This graph is different from general Graph databases in that it uses exactly one type of relationship among all its datums. More complex relationships are built as graph structures of the fundamental "is" relation.

Users create various Datum Universes to store data. The data content of the various Datum Universe is largely different, but may contain duplicate "common knowledge" parts.

DKS is a distributed fault-tolerant computer system. The current implementation uses 5 types of computer systems. These are: Servers 640, 650, Routers 620, Loggers 630, Maintainers (not shown on the graph), and Clients. It is noted, however, that more or fewer computer systems may be used while maintaining the spirit of the present principles.

According to an embodiment, clients 610 may send two main categories of commands; "Tell" requests, in which they add new data to the DKS, and "Ask" requests, in which they query the content. According to an embodiment, servers 640, 650 are the workers that accept new data and respond to queries. Servers store data in RAM memory.

The identification of "Tell" versus "Ask" commands is very important to a multi-server system. The server knows which API functions are "Tell" functions and which are "Ask" functions. However, the user can send a generic "Ask" command that includes a source code. If the source code causes any modification in the Datum Universe, the server itself will prevent the command and returns an error to the user. This prevents one server to become different from the other servers.

Routers are responsible of assigning client requests to one or more servers. Loggers store requests in permanent storage (Disk) and periodically store a snapshot of the server memory to permanent storage. Maintainers have the responsibility of monitoring Servers (shown in FIG. 6 as Server A1, Server A2, and Server A3 (of Datum Universe A) 640, and Server B1 and Server B2 (of Datum Universe B)) 650, Routers 620 (shown in FIG. 6 as Router 1 and Router 2), and Loggers 630 (shown in FIG. 6 as Logger1 and Logger2), and of maintaining them in good "health." Finally, Clients 610 (shown in FIG. 6 as Client1, Client2, Client3, Client4, and Client5) are the computer systems that human users and/or other systems use to tell data and ask questions. It is noted that any suitable quantities of Clients 610, Routers 620, Loggers 630, and/or Servers 640, 650 may be used while maintaining the spirit of the present invention.

According to an embodiment, the server works as a standalone server without a router 620. According to an embodiment, the server 640, 650 works as a disposable server among a multi-server/router configuration.

The Datumtronic Router is not an ordinary router. An ordinary router oversees the routing of commands from clients to servers to balance the load among servers. A Datumtronic Router is designed specifically for the Datumtronic servers.

According to an embodiment, a new tell command must be sent to all running servers so that the servers keep their data synchronized.

According to an embodiment, each "Tell" command must be validated against the graph to ensure that new data is not breaking the Datum graph rules (Acyclic and Transitive Reduction) and to ensure that new data is indeed new and not merely a replication of existing data.

According to an embodiment, the validation needs to happen only once. Therefore, the first server that validates new data must communicate the result back to the router. If the data is found to be new and valid, the router sends the "Tell" command to all other servers with a note that the data is already valid.

According to an embodiment, each server 640, 650 may make inferences and may create new datums upon receiving new data. This process is dependent on the order of the incoming tell commands. One sequence may result from different datums being created for another sequence. This necessitates that all "Tell" commands are added to all servers in the same sequence.

According to an embodiment, the router 620 cannot be a single point of failure; therefore, all clients 610 have a list of Datumtronic Routers that they can use. At any given point of time, there is only one Router (called the primary router) that is sending "Tell" and "Ask" commands to the servers. If the primary router fails, the following router in the list of routers is promoted up and becomes the one primary router. The switching of the primary router is accomplished through a protocol between the clients, the new primary router, and the servers.

Knowledge is stored using the Datum Universe Model.

According to an embodiment, all clients have the same list of routers in the same order. It is noted, however, that the order may be altered for one or more clients while still maintaining the spirit of the present invention.

Each client has a Primary router. According to an embodiment, the Primary router is maintained in order to be the same to all of the clients. Furthermore, all servers have a router identification (router id). The router id is maintained to be the same to all of the servers. According to an embodiment, the router id is the last portion of the router's Uniform Resource Identifier (URI) address.

According to an embodiment, when a client fails to send a command to a router, the system switches its Primary router to the second router in its list. After switching the Primary router to the second router in its list, the system sends the new Primary router the command.

Each router has an identification indicating whether or not the router is the Primary router. Therefore, each router can determine if it is listed as the Primary router.

According to an embodiment, if a secondary router which is not a Primary router receives a command, it assumes that there must be an issue with the Primary router. Once it is assumed that there is an issue with the Primary router, the secondary router attempts to take over as the new Primary router. It sends a command to all servers to set their router id to itself. Once the other servers set their router id to the secondary router, the secondary router becomes the new Primary router.

According to an embodiment, if a server receives an API command from a router id different from its current router id, it will ignore it and return a status of invalidRouter.

According to an embodiment, all sending clients are capable of identifying that a Primary router has an issue. According to an embodiment, once the clients have determined that the Primary router has an issue, the clients will switch to a new Primary router. According to an embodiment, the new Primary router is the next router in the client's list of routers.

According to an embodiment, the router sends "tell" commands to all servers in a sequence. This command locks an internal list corresponding to servers.

According to an embodiment, one or more of the servers are composed of a Datumtronic Command Processor and a Primary (built-in) Compiler. According to an embodiment, the processor translates each command into one or more Datumtron API functions, executes these functions, and prepares the result to be sent to back to client.

According to an embodiment, the Compiler translates code written in the primary programming language into executable code that includes calls to Datumtron API functions. The result of the final code statements is prepared and sent back to the client.

According to various embodiments, other programming languages may be used to specify commands to the server provided that their compilers are added to the Datum Universe as katums.

In a multi-server Datumtronic server configuration, each server maintains its own copy of the Datum Universe. New knowledge must be added to all servers in the same order. According to an embodiment, when a "tell" command supplied to a Datumtronic server system, it is sent to each server connected to that system so that each server may update its own copy. According to an embodiment, when an "ask" command is supplied to the Datumtronic server system, only one server needs to process and reply with an answer.

According to an embodiment, the Datumtronic server system includes an active router. The active router ensures that all the Datumtronic servers contain the same knowledge and that all servers receive new knowledge in the same order. This ensures that all servers provide the same answer to any "ask" command at any time. According to an embodiment, the order of data being added to each server must remain consistent to ensure that any inferences that are made at any point in time are based on the same knowledge content.

According to an embodiment, a server in the Datumtronic server system can process one "tell" request at a time. The router keeps track of what command is being processed by each server by maintaining a list of lock objects where each object corresponds to one server. When a server is locked for a "Write" request, it cannot process any other commands until the "Write" request is completed. When a server is locked for a "Read" request, it can keep processing other read requests but no "Write" requests until it is done.

According to an embodiment, there are two extreme approaches to locking the servers. First, all servers are locked at the same time for a tell command. The tell command is processed by all servers in parallel, and when all servers are done, the system is ready to process new commands. Second, and conversely, one server is locked at a time while the other servers continue to process "ask" commands. As a compromise, a number of servers may be locked together for "Writing" requests while the other servers continue to process "ask" commands.

According to an embodiment, the first listed server in the internal list of servers is set as the Primary server, also called the Primary Tell Server (PTS).

According to an embodiment, the router sends ask commands to only one server at random/round robin. Possibly excluding the PTS.

According to an embodiment, to ensure that each server in a Datumtronic server system receives new data in the same order, all servers are locked and given a "tell" command in the same order every time. However, according to an embodiment, an "ask" command may be processed by any one server. This may be achieved in two ways.

First, an "ask" command is sent to any server at random, or sent to them in a sequential order with no regards to how busy they are. Secondly, the "ask" command is sent to the least busy server by measuring the number of "ask" commands that each server is currently processing. According to an embodiment, the number of commands only indicates how busy a server is if the commands need equal processing resources of the server.

According to an embodiment, all of the routers have the same server list.

The server designated as the PTS is enabled to execute the tell command and returns a status to the router. According to an embodiment, if the tell command does not result in actual changes to the Datum Universe, then the router treats the tell command as an ask command and does not send it to the other servers.

There is only a need to validate a tell command once. The PTS sends a status of valid or invalid. According to an embodiment, if the status is invalid, the command is not sent to the other servers.

Figure 7:
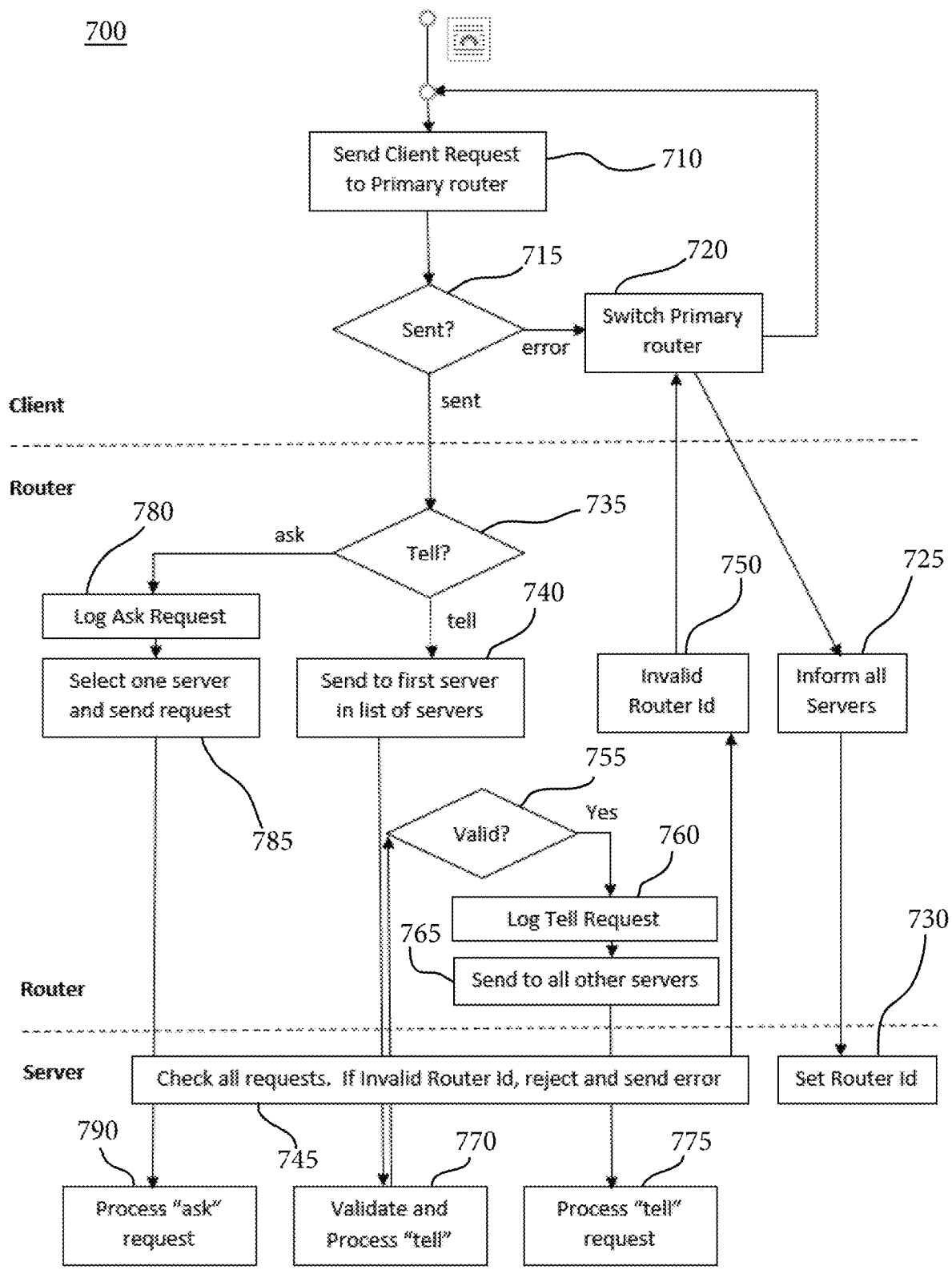
FIG. 7 shows a flowchart of a method for assigning client requests to one or more computer-implemented servers, according to an embodiment of the present invention.

Referring now to FIG. 7, a method 700 for assigning client requests to one or more computer-implemented servers is illustratively depicted.

At step 710, at least one request is received by the routers from the plurality of clients coupled to the routers, and the client request is sent to the primary router, wherein one of the routers is designated as the primary router. According to an embodiment, the requests may include one or more commands to be completed by the servers. According to an embodiment, each router includes a unique identification code. According to an embodiment, each of the plurality of servers is programmed to receive requests only from the primary router.

At step 715, it is determined whether the client request was sent to the primary router. If there was an error, the primary router is switched to a new router (step 720). Once the primary router is switched, all servers are informed of the new primary router (step 725) and the router ID is set (step 730).

According to an embodiment, the routers are defined as a set list of routers and each of the plurality of clients is in possession of the set list of routers. According to an embodiment, each of the plurality of clients is configured to send requests to the primary router.

If the request is sent, it is determined whether the request is a "tell" command or an "ask" command (step 735). If the request is a "tell" command/request, the command is sent to the first server in the list of servers (step 740). All requests are checked (at step 745) to see if it has a valid router ID. If the request is not valid, the router is labeled as an invalid router ID (at step 750) and the primary router is switched (step 720).

The Primary server validates and processes the "tell" request is logged (step 760) and sent to all of the other servers (step 765). Validated "tell" requests are processed (step 775).

If the request is determined to be an "ask" command/request, the "ask" request is logged (at step 780). According to an embodiment, one or more requests are stored into at least one logger that includes a storage medium. At step 785, one server is selected and the request is sent.

According to an embodiment, once sent to the server, the request is checked (at step 745) to see if it has a valid router Id. If the request is not valid, the router is labeled as an invalid router ID (at step 750) and the primary router is switched (step 720).

At step 790, the "ask" request is processed. According to an embodiment, the "ask" request is processed without being validated.

Figure 8:
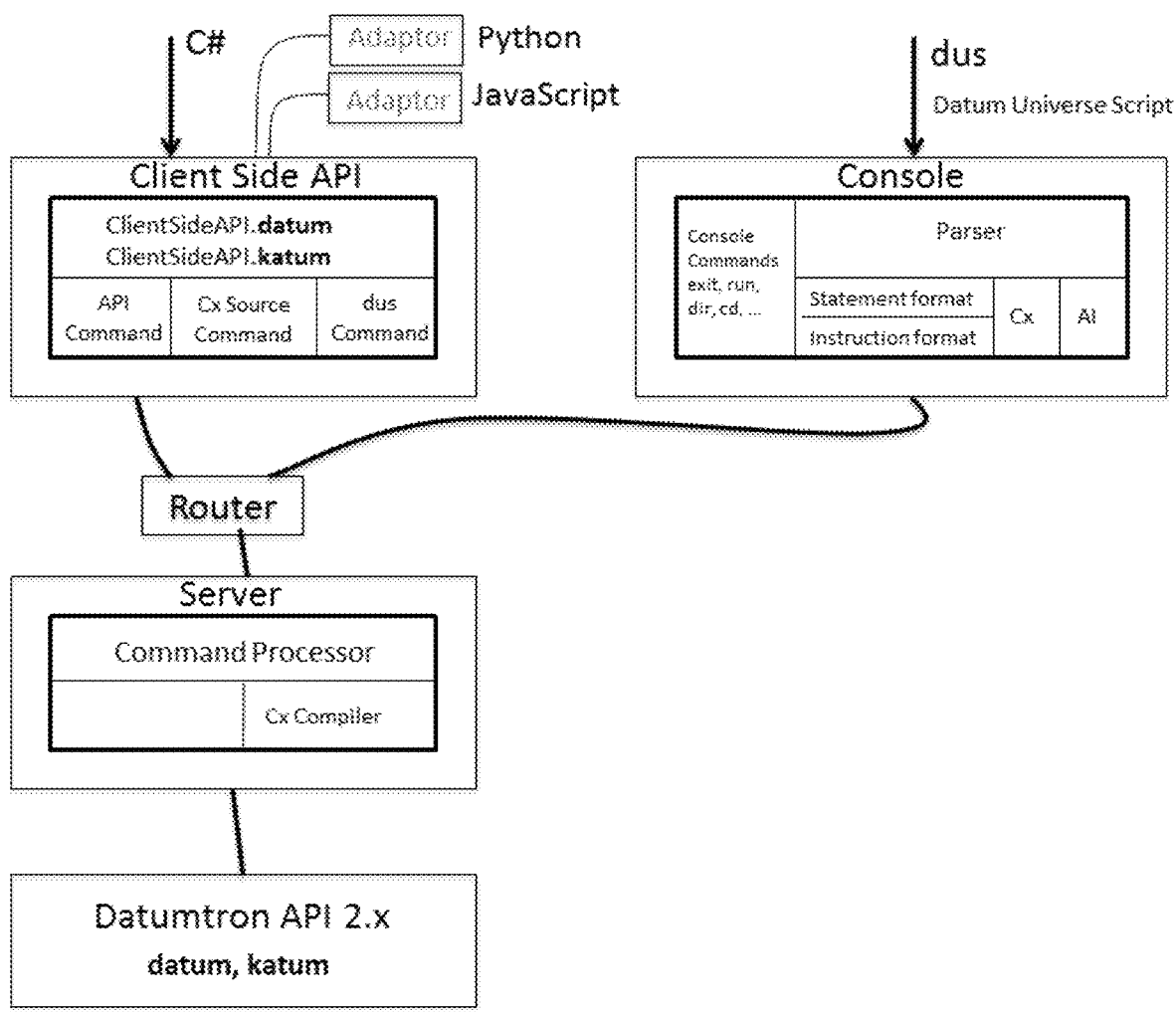
FIG. 8 shows a block diagram of software components in the DKS, according to an embodiment of the present invention.

Referring now to FIG. 8, a block diagram of a Datumtronic server is illustratively depicted, in accordance with an embodiment of the present invention.

According to an embodiment, the Datumtronic server may include a client side API and a console, each coupled to at least one router. The router may further be coupled to at least one server. The server may be utilizing the Datumtron API According to an embodiment, the client-side API abstracts away the details of communicating with servers from the user. The developer uses functions identical to the API functions executing at the servers.

According to an embodiment, the Datumtronic Server may execute commands in one of three modes. First, for individual Datumtron API functions, on a client-side API, the server has a corresponding command for each API function. Second, for generic "ask" an/or "tell" commands that include a source code (in one of several common programming languages) of multiple Datumtron API calls, the server compiles the source code into special functions, caches it, executes the compiled function against the Datum Universe, and returns the result to a client (directly or indirectly). Third, when the Datum Universe itself has katums that have attached executable code, the server can receive it as data and execute it as code.

According to an embodiment, an interactive console is used to send commands to the server and display results to the user. The console includes a parser which executes console commands such as, e.g., "exit," "run", "dir", "cd", etc. The parser also interprets commands in a special Datum Universe Script (dus) into Datumtron API functions and executes them on the server. The dus parser can interpret statements written in either a Statement format (which is more natural language like) and Instruction format (which is a command followed by a set of parameters). The parser can parse generic commands in the 'C' style languages.

Systems, Devices and Operating Systems

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and/or a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller; Intel's MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present inveniton), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, lighting, video monitors and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component includes several tables. A Users (e.g., operators and physicians) table may include fields such as, but not limited to: user_id, ssn, dob, first_name, last_name, age, state, address_firstline, address_secondline, zipcode, devices_list, contact_info, contact_type, alt_contact_info, alt_contact_type, and/or the like to refer to any type of enterable data or selections discussed herein. The Users table may support and/or track multiple entity accounts. A Clients table may include fields such as, but not limited to: user_id, client_id, client_ip, client_type, client_model, operating_system, os_version, app_installed_flag, and/or the like. An Apps table may include fields such as, but not limited to: app_ID, app_name, app_type, OS_compatibilities_list, version, timestamp, developer_ID, and/or the like.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

Various other components may be included and called upon for providing for aspects of the teachings herein. For example, additional materials, combinations of materials and/or omission of materials may be used to provide for added embodiments that are within the scope of the teachings herein. In the present application a variety of variables are described, including but not limited to components and conditions. It is to be understood that any combination of any of these variables can define an embodiment of the disclosure. Other combinations of articles, components, conditions, and/or methods can also be specifically selected from among variables listed herein to define other embodiments, as would be apparent to those of ordinary skill in the art.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system for assigning client requests to one or more computer-implemented servers, the system comprising:
   at least one client coupled to at least one router, wherein each client of the at least one client includes a processor configured to analyze inputted data;
   the at least one router configured to assign requests input through the at least one client to the one or more computer-implemented servers;
   at least one processor having a memory, the memory having computer readable instructions stored thereon that, when executed by the at least one processor, enables the storing of the requests; and
   the one or more computer-implemented servers configured to:
      store the inputted data as a graph comprising nodes interconnected via one type of linkage,
         wherein the nodes represent datums,
         wherein each knowledge element is a katum, and
         wherein the katum is a datum having an attached primitive data type object;
      receive, from the at least one router, the requests input through the at least one client; and
      perform tasks indicated by the requests by deducing inferences from the graph in near-real time to identify new datums.

2. The system as recited in claim 1, wherein each of the datums is an element of data.

3. The system as recited in claim 2,
   wherein each of the datums is defined by its connection to one or more other nodes in the graph, and
   wherein each connection flows in a same direction.

4. The system as recited in claim 1,
   wherein the graph is a directed acyclic graph, and
   wherein the directed acyclic graph is in a transitive reduction form.

5. The system as recited in claim 1,
   wherein each knowledge element is stored in the one or more computer-implemented servers as a directed acyclic graph of interconnected datums, and
   wherein each of the datums is defined by its connection to one or more other nodes in the directed acyclic graph.

6. The system as recited in claim 1,
   wherein the processor further includes at least one logger,
   wherein the at least one logger includes a storage medium and is configured to store the requests.

7. The system as recited in claim 1, wherein each of the at least one router includes a unique identification code.

8. The system as recited in claim 7, wherein one of the routers of the at least one router is designated as a primary router.

9. The system as recited in claim 8, wherein each of the one or more computer-implemented servers is programmed to receive requests only from the primary router.

10. The system as recited in claim 9, wherein, if an error is found with the primary router, all of the at least one clients are configured to select a new primary router and the one or more computer-implemented servers become programmed to receive requests only from the new primary router.

11. The system as recited in claim 8, wherein the at least one router is defined as a set list of routers and each of the at least one clients is in possession of the set list of routers.

12. The system as recited in claim 11, wherein each of the at least one clients is configured to send requests to the primary router.

13. The system as recited in claim 8, wherein the one or more computer-implemented servers are set as a list of servers in a particular order.

14. The system as recited in claim 13, wherein a first computer-implemented server in the list of servers is designated as a primary server.

15. The system as recited in claim 14, wherein the primary router is configured to route a tell request to the primary server first.

16. The system as recited in claim 15,
   wherein the primary server is configured to validate the tell request, and
   wherein the primary router, once the tell request is validated, is configured to route the tell request to the one or more computer-implemented servers.

17. A method for assigning client requests to one or more computer-implemented servers, the method comprising:
   receiving, from at least one client coupled to at least one router, at least one request, wherein each client of the at least one client includes a processor configured to analyze inputted data;
   assigning, using the at least one router, the at least one request to one or more computer-implemented servers;
   storing, in a memory of the processor, the at least one request;
   storing, using the one or more computer-implemented servers, the inputted data as a graph comprising nodes interconnected via one type of linkage,
      wherein the nodes represent datums,
      wherein each knowledge element is a katum, and
      wherein the katum is a datum having an attached primitive data type object;

receiving, by the one or more computer-implemented servers and from the at least one router, the at least one request input through the at least one client; and performing, using the one or more computer-implemented servers, tasks indicated by the at least one request assigned to each of the one or more computer-implemented servers by deducing inferences from the graph in near-real time to identify new datums.

18. The method as recited in claim 17, wherein each of the datums is an element of data.

19. The method as recited in claim 17,
wherein each of the datums is defined by its connection to one or more other nodes in the graph, and
wherein each connection flows in a same direction.

20. The method as recited in claim 17, wherein the graph is an directed acyclic graph.

21. The method as recited in claim 17, wherein the graph is a directed acyclic graph, and wherein each of the datums is defined by its connection to one or more other nodes in the directed acyclic graph.

22. The method as recited in claim 17, wherein each of the at least one router includes a unique identification code.

23. The method as recited in claim 22, further comprising designating one of the routers of the at least one router as a primary router.

24. The method as recited in claim 23, further comprising programming each of the one or more computer-implemented servers is to receive requests only from the primary router.

25. The method as recited in claim 24, further comprising, if an error is found with the primary router, selecting, using the at least one client, a new primary router, and wherein the one or more computer-implemented servers become programmed to receive requests only from the new primary router.

26. The method as recited in claim 23, wherein the at least one router is defined as a set list of routers and each of the at least one clients is in possession of the set list of routers.

27. The method as recited in claim 26, wherein each of the at least one clients is configured to send requests to the primary router.

28. The method as recited in claim 23, wherein the one or more computer-implemented servers are set as a list of servers in a particular order.

29. The method as recited in claim 17, further comprising designating a first computer-implemented server in the list of servers as a primary server.

30. The method as recited in claim 29, further comprising routing, using the primary router, a tell request to the primary server first.

31. The method as recited in claim 30, further comprising:
validating, using the primary server, the tell request; and
once the tell request is validated, routing, using the primary router, the tell request to the one or more computer-implemented servers.

32. A system for assigning client requests to one or more computer-implemented servers, the system comprising:
at least one client coupled to the one or more computer-implemented servers, wherein each client of the at least one client includes a processor configured to analyze inputted data, and wherein each of the at least one client is configured to assign requests to the one or more computer-implemented servers;
at least one processor having a memory, the memory having computer readable instructions stored thereon that, when executed by the processor, enables the storing of the requests; and
the one or more computer-implemented servers being configured to:
store the inputted data as a graph comprising nodes interconnected via one type of linkage,
wherein the nodes represent datums,
wherein each knowledge element is a katum, and
wherein the katum is a datum having an attached primitive data type object, receive, from the at least one client, the requests; and
perform tasks indicated by the requests by deducing inferences from the graph in near-real time to identify new datums.

33. The system as recited in claim 32, wherein each of the datums is an element of data.

34. The system as recited in claim 33,
wherein each of the datums is defined by its connection to one or more other nodes in the graph, and
wherein each connection flows in a same direction.

35. The system as recited in claim 34, wherein the graph is a directed acyclic graph in a transitive reduction form.

36. The system as recited in claim 32,
wherein the graph is a directed acyclic graph, and
wherein each of the datums is defined by its connection to one or more other nodes in the directed acyclic graph.

37. The system as recited in claim 32,
wherein the processor further includes at least one logger,
wherein the at least one logger includes a storage medium and is configured to store the requests.

* * * * *